C. M. BOYCE

METHOD OF AND APPARATUS FOR MAKING AND FINISHING PRINTS

Sept. 15, 1931. Re. 18,191

Original Filed Nov. 21, 1928 13 Sheets-Sheet 1

Inventor:
Charles M. Boyce,
By Fanning & Fanning
Att'ys.

C. M. BOYCE

METHOD OF AND APPARATUS FOR MAKING AND FINISHING PRINTS

Sept. 15, 1931.

Re. 18,191

Original Filed Nov. 21, 1928 13 Sheets-Sheet 2

C. M. BOYCE

METHOD OF AND APPARATUS FOR MAKING AND FINISHING PRINTS

Sept. 15, 1931.

Re. 18,191

Original Filed Nov. 21, 1928 13 Sheets-Sheet 3

C. M. BOYCE

METHOD OF AND APPARATUS FOR MAKING AND FINISHING PRINTS

Sept. 15, 1931. Re. 18,191

Original Filed Nov. 21, 1928 13 Sheets-Sheet 4

Inventor:
Charles M. Boyce,
By Fanning & Fanning
Attys.

C. M. BOYCE

METHOD OF AND APPARATUS FOR MAKING AND FINISHING PRINTS

Sept. 15, 1931.

Re. 18,191

Original Filed Nov. 21, 1928 13 Sheets-Sheet 5

Inventor:
Charles M. Boyce,
By Banning & Banning
Attys.

C. M. BOYCE

METHOD OF AND APPARATUS FOR MAKING AND FINISHING PRINTS

Sept. 15, 1931.

Re. 18,191

Original Filed Nov. 21, 1928 13 Sheets-Sheet 6

C. M. BOYCE

METHOD OF AND APPARATUS FOR MAKING AND FINISHING PRINTS

Sept. 15, 1931.

Re. 18,191

Original Filed Nov. 21, 1928 13 Sheets-Sheet 7

Inventor:
Charles M. Boyce,
By Banning & Banning
Attys.

C. M. BOYCE

METHOD OF AND APPARATUS FOR MAKING AND FINISHING PRINTS

Sept. 15, 1931.

Re. 18,191

Original Filed Nov. 21, 1928 13 Sheets-Sheet 8

Inventor.
Charles M. Boyce,
By Banning & Banning
Attys.

C. M. BOYCE
METHOD OF AND APPARATUS FOR MAKING AND FINISHING PRINTS
Sept. 15, 1931.
Re. 18,191
Original Filed Nov. 21, 1928 13 Sheets-Sheet 9
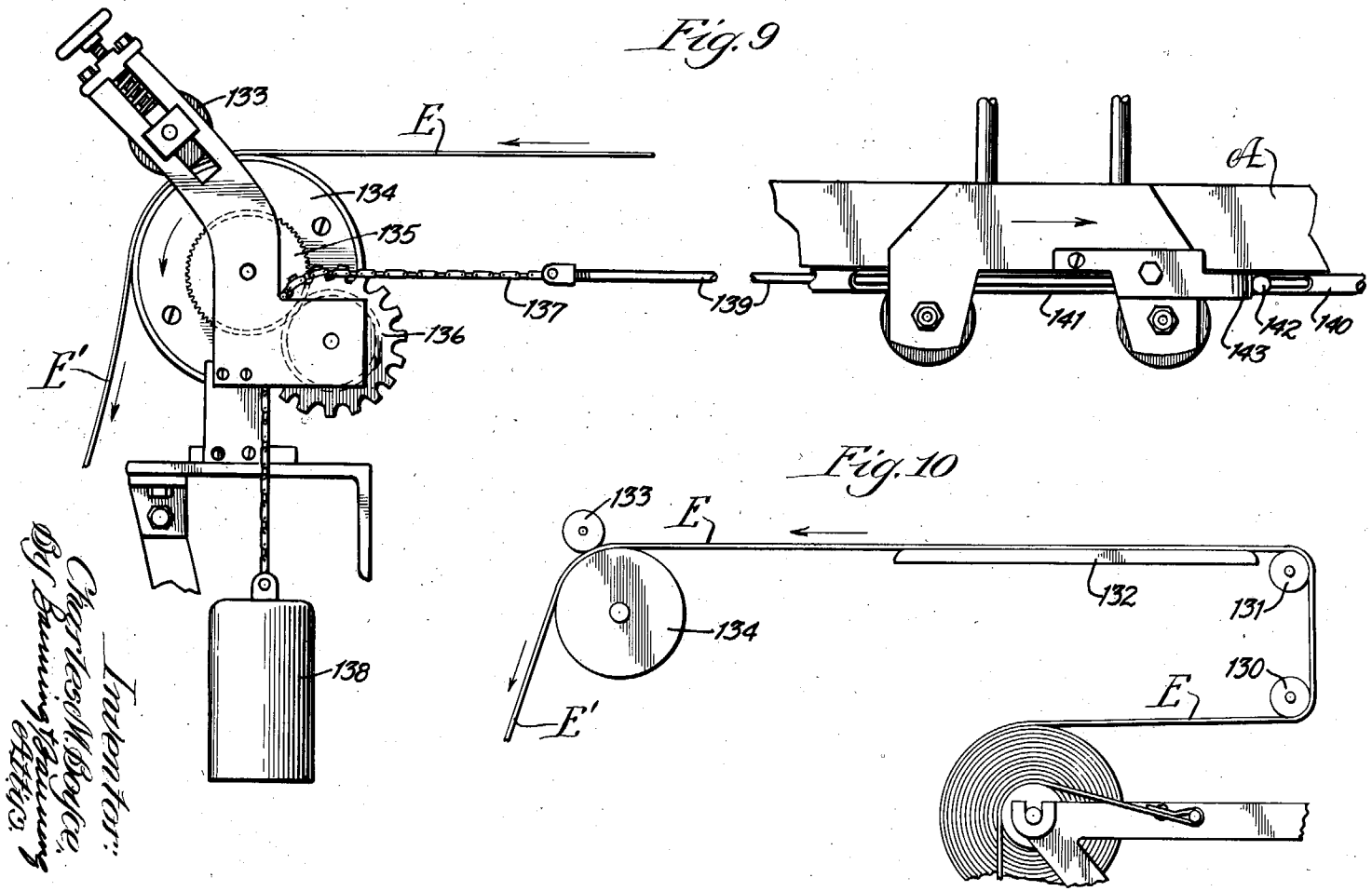
Inventor:
Charles M. Boyce,
By Banning & Banning
Attys.

C. M. BOYCE

METHOD OF AND APPARATUS FOR MAKING AND FINISHING PRINTS

Sept. 15, 1931.

Re. 18,191

Original Filed Nov. 21, 1928 13 Sheets-Sheet 10

Inventor:
Charles M. Boyce,
By Banning & Banning
Att'ys.

C. M. BOYCE

METHOD OF AND APPARATUS FOR MAKING AND FINISHING PRINTS

Sept. 15, 1931.

Re. 18,191

Original Filed Nov. 21, 1928 13 Sheets-Sheet 11

Inventor:
Charles M. Boyce,
By Fanning & Fanning
Att'ys.

C. M. BOYCE

METHOD OF AND APPARATUS FOR MAKING AND FINISHING PRINTS

Sept. 15, 1931. Re. 18,191

Original Filed Nov. 21, 1928 13 Sheets-Sheet 12

Inventor:
Charles M. Boyce,
By Banning & Banning
Att'ys.

C. M. BOYCE

METHOD OF AND APPARATUS FOR MAKING AND FINISHING PRINTS

Sept. 15, 1931. Re. 18,191

Original Filed Nov. 21, 1928 13 Sheets-Sheet 13

Inventor:
Charles M. Boyce,
By Banning & Banning
Attys.

Reissued Sept. 15, 1931

Re. 18,191

UNITED STATES PATENT OFFICE

CHARLES M. BOYCE, OF CEDAR RAPIDS, IOWA, ASSIGNOR, BY MESNE ASSIGNMENTS, TO JOHN R. DITMARS, OF NEW YORK, N. Y.

METHOD OF AND APPARATUS FOR MAKING AND FINISHING PRINTS

Original No. 1,719,796, dated July 2, 1929, Serial No. 320,783, filed November 21, 1928. Application for reissue filed June 3, 1931. Serial No. 541,930.

An object of this invention is to provide a means for making prints of the continuous tone type from printing plates, particularly of the swelled gelatin type, and of finishing these prints so as to give them more of the brilliance, depth and definition of contact photographic prints.

Another object is to provide a method of and apparatus for finishing prints made by any one of a number of well known methods so as to give them a luster and depth of tone such as is now possessed only by photographic prints.

Another object is to provide mechanism whereby prints may be made from a plate, preferably of the continuous tone type, and the images transferred as by means of a "rubber blanket" to a sheet of paper, this sheet preferably being in the form of a roll so that it may be passed continuously through another part of the mechanism for finishing.

These and other objects as will hereinafter appear are accomplished by this invention which is fully described in the following specification, and shown in the accompanying drawings, in which—

Figure 1:
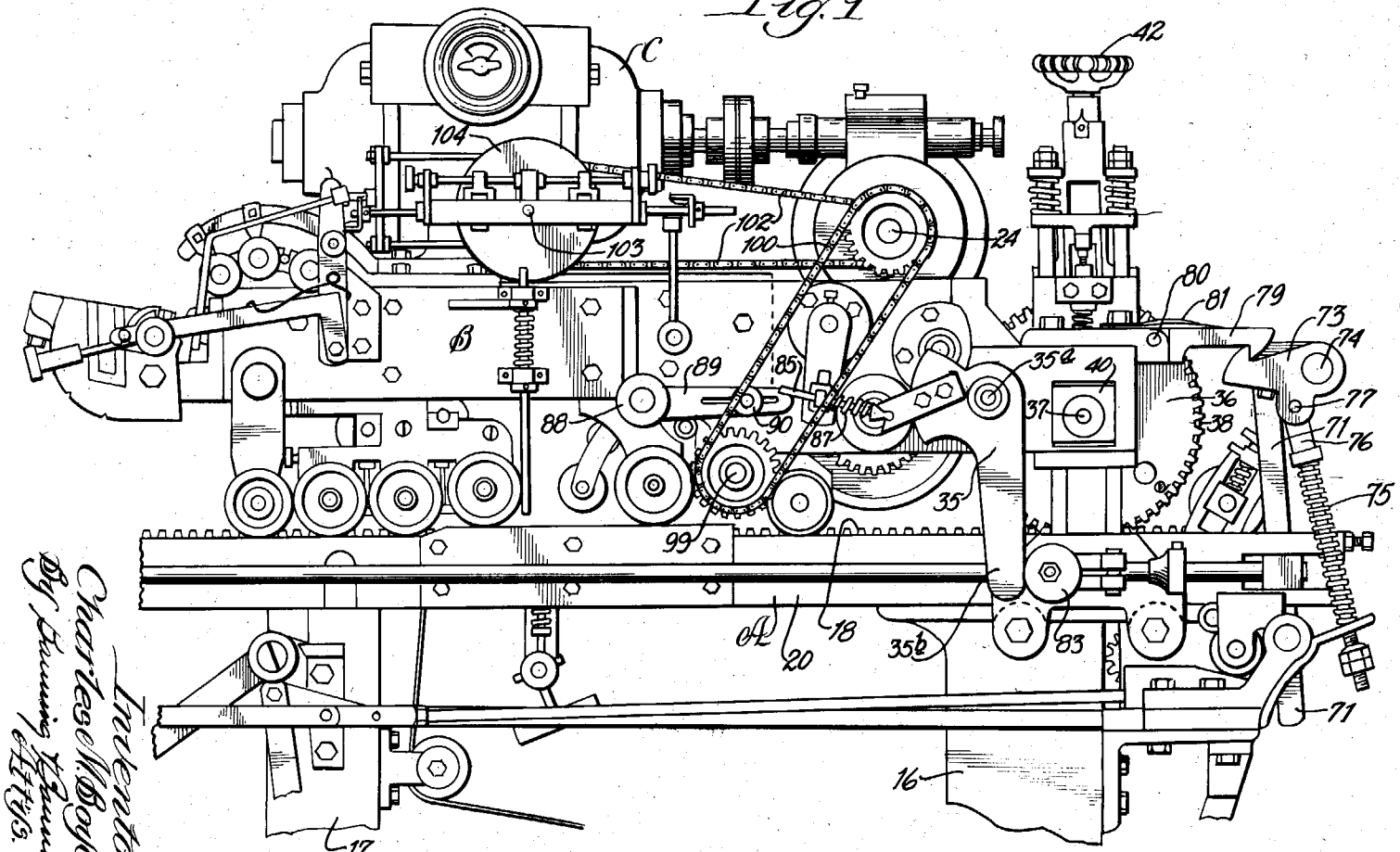
Figure 1 is a front elevation of the forward end of the printing mechanism showing the carriage in position to start back on the return trip.
Figure 2:
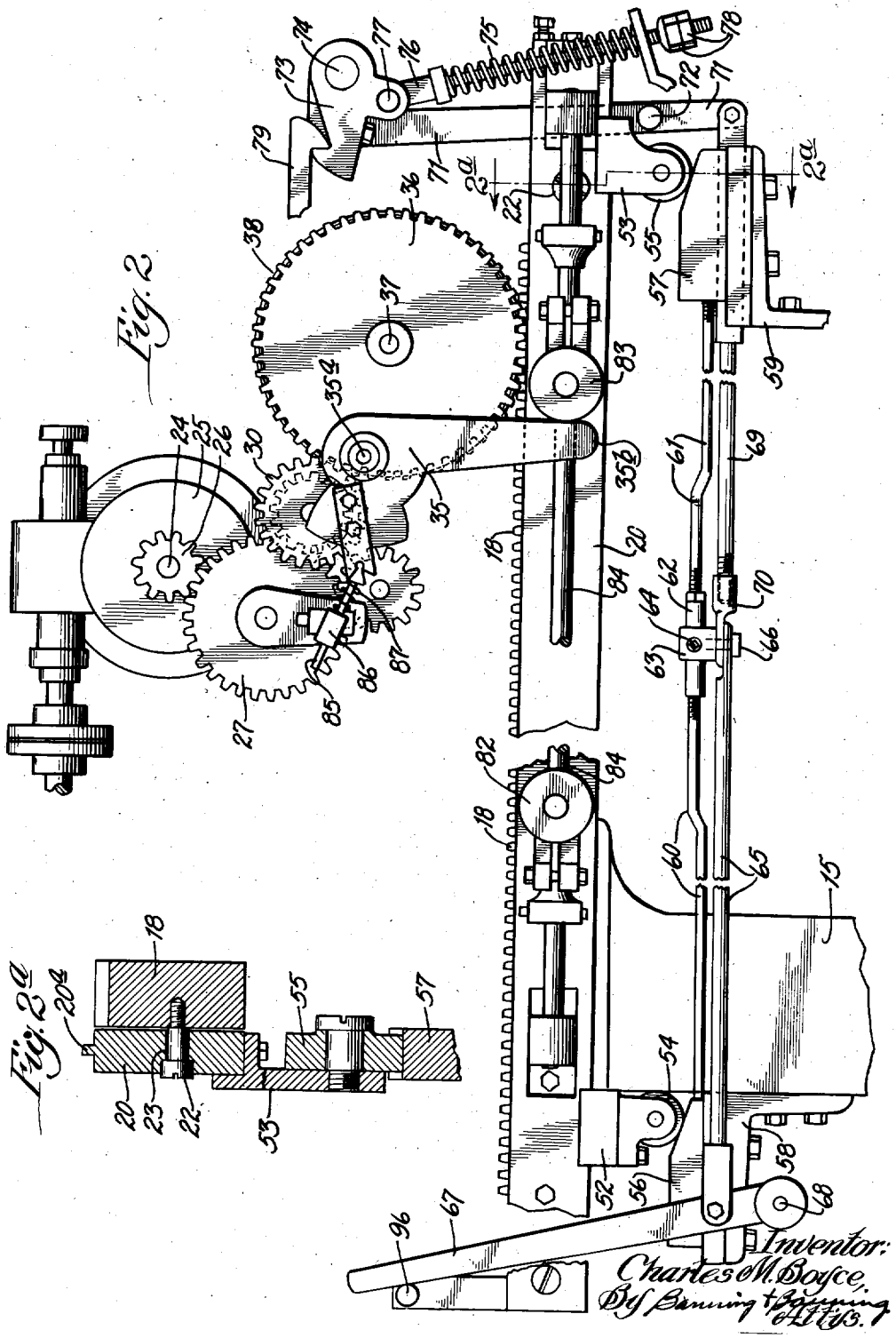
Fig. 2 is a partial enlarged view from the same point showing the driving and elevating mechanism.
Figure 3:
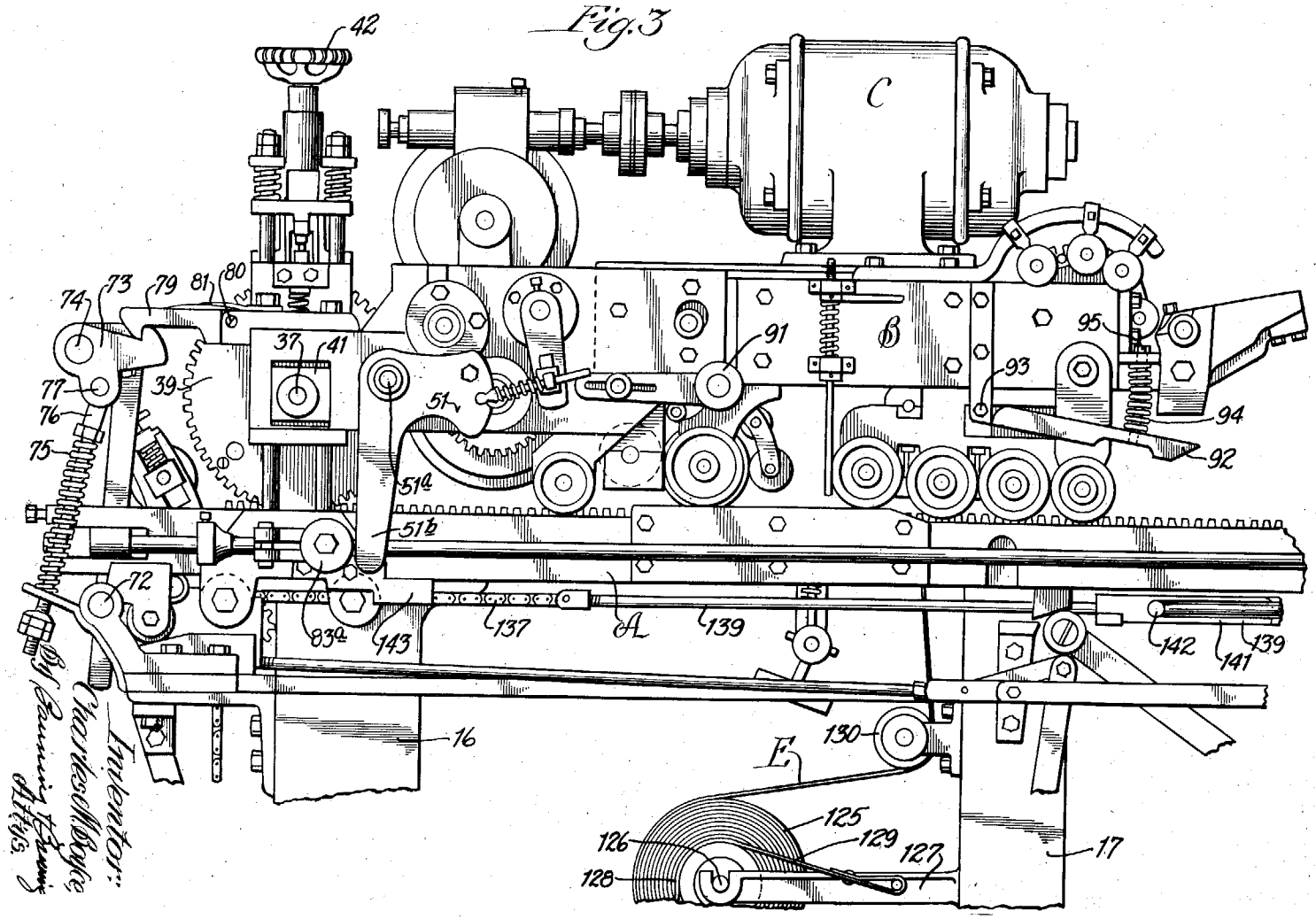
Figure 4:
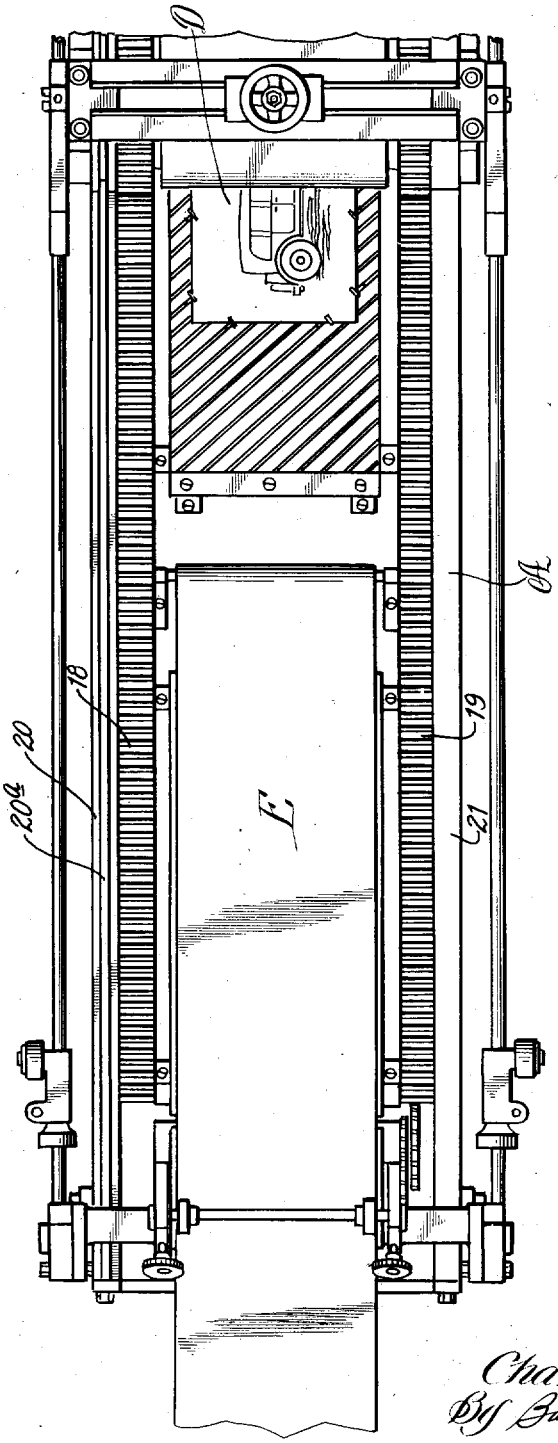
Figure 5:
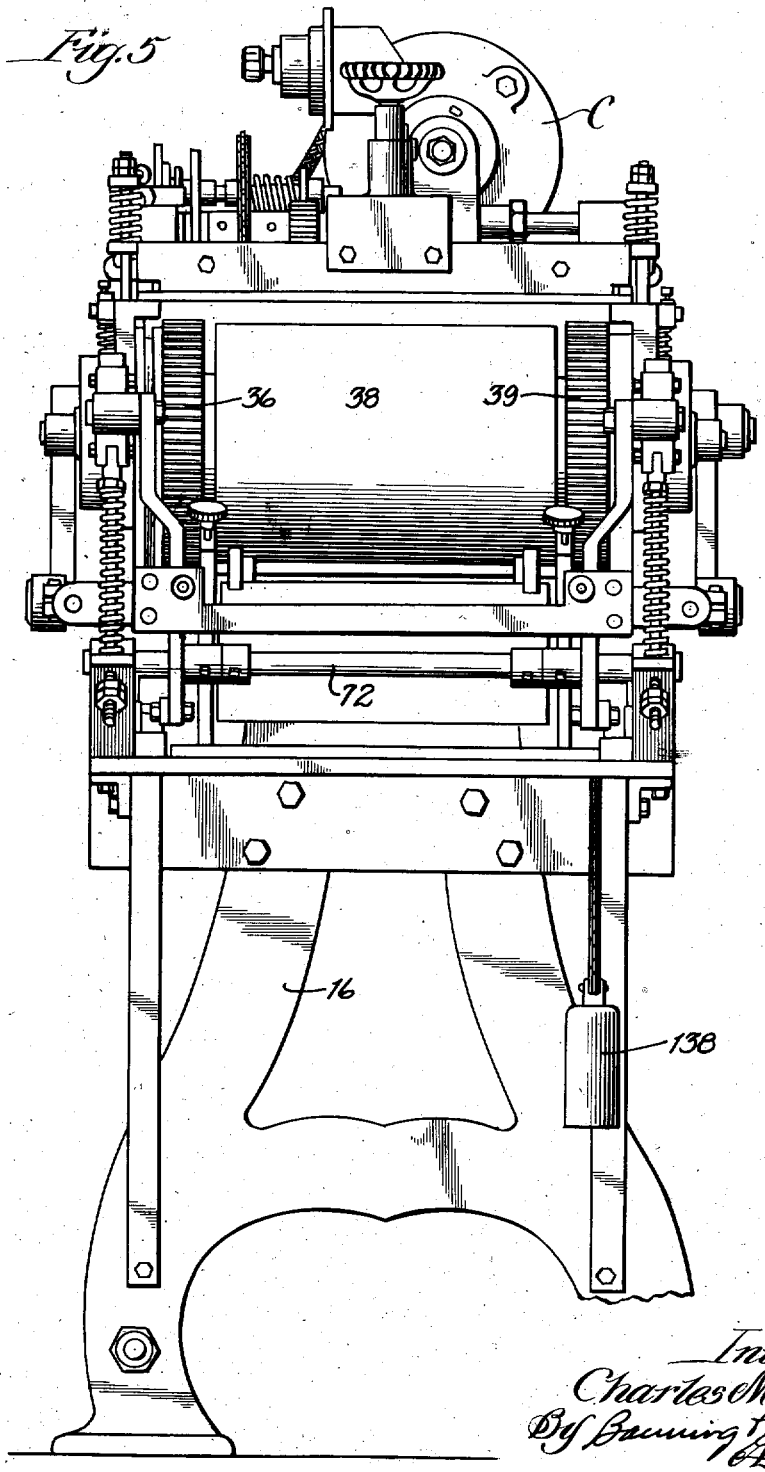
Figure 6:
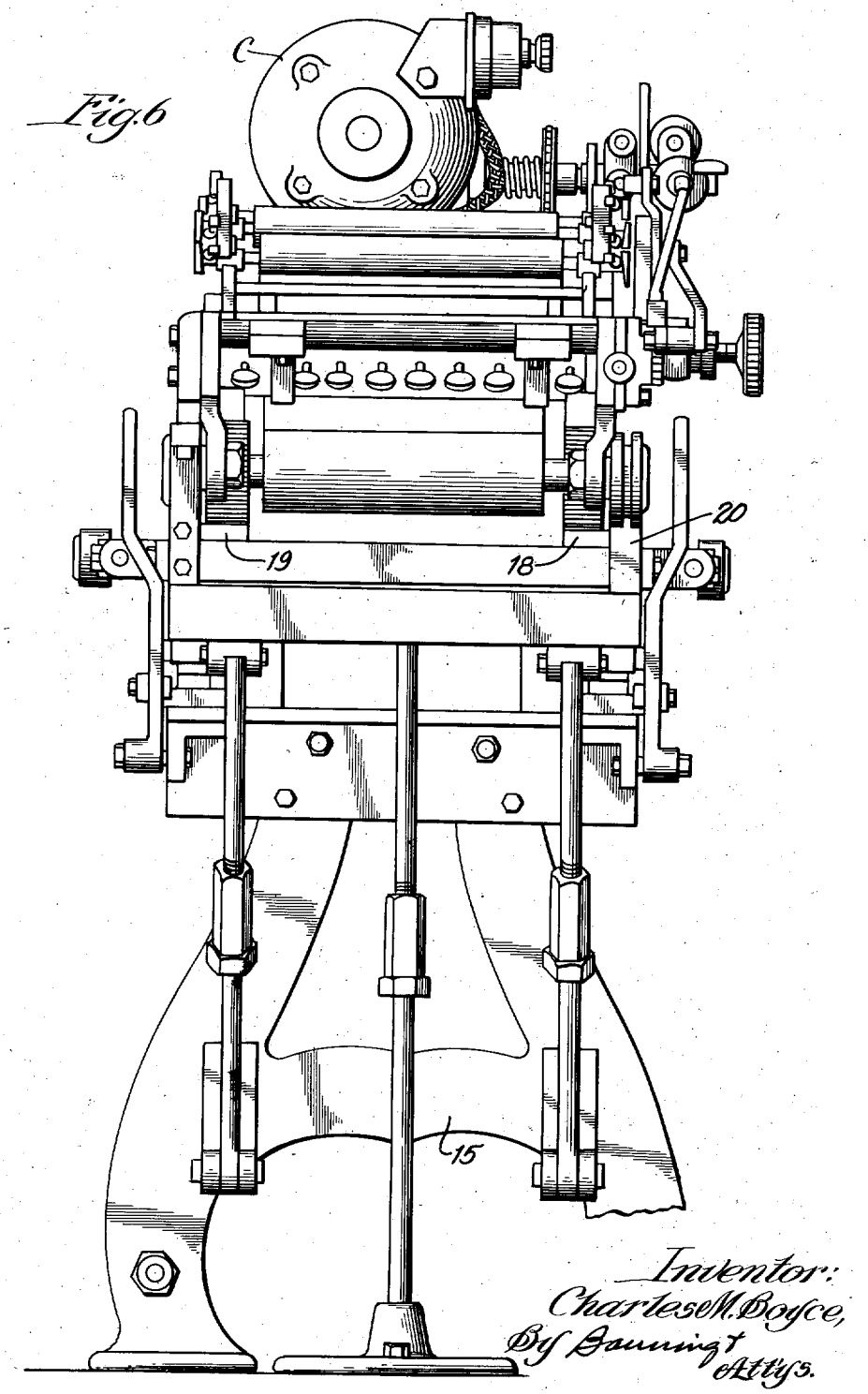
Figure 7:
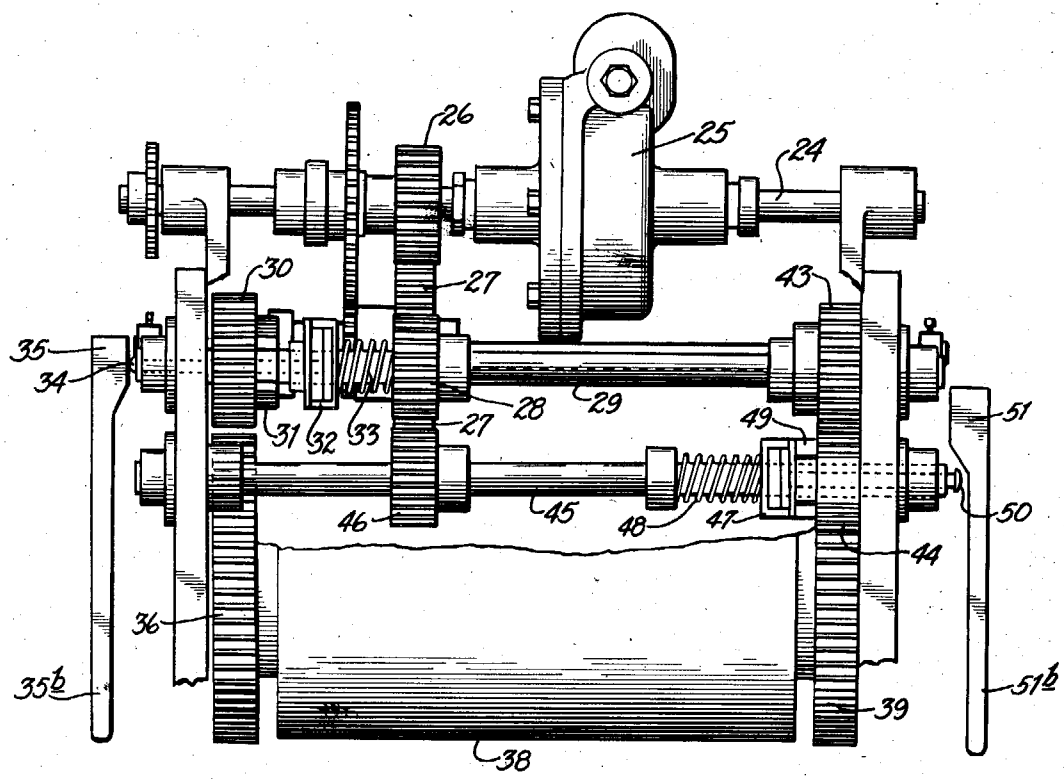
Figure 8:
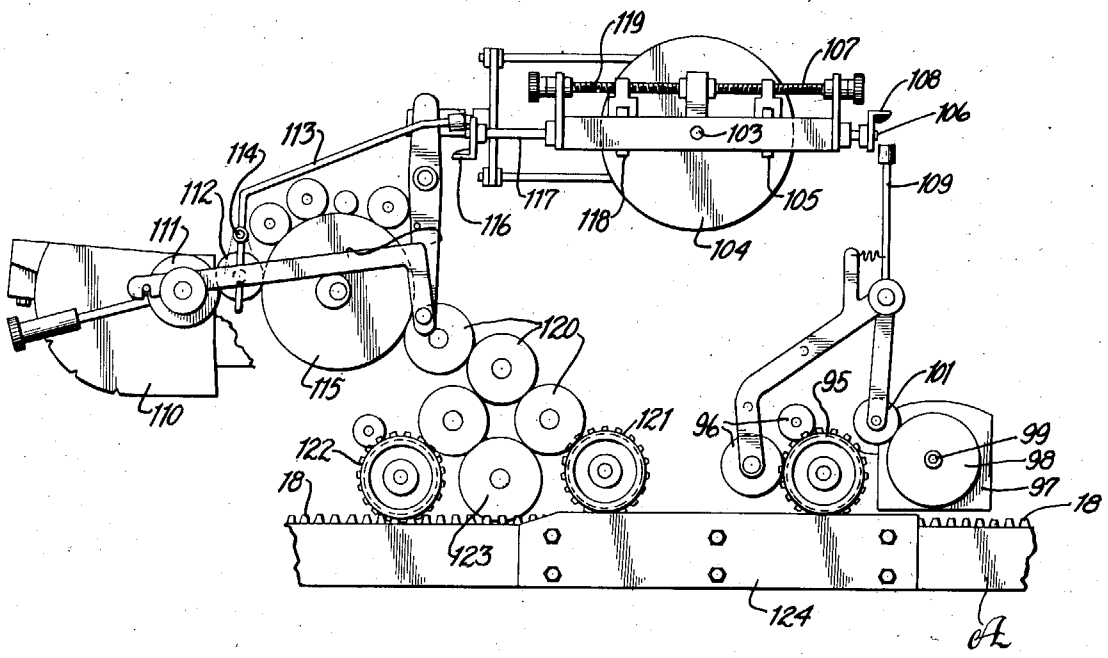
Figure 11:
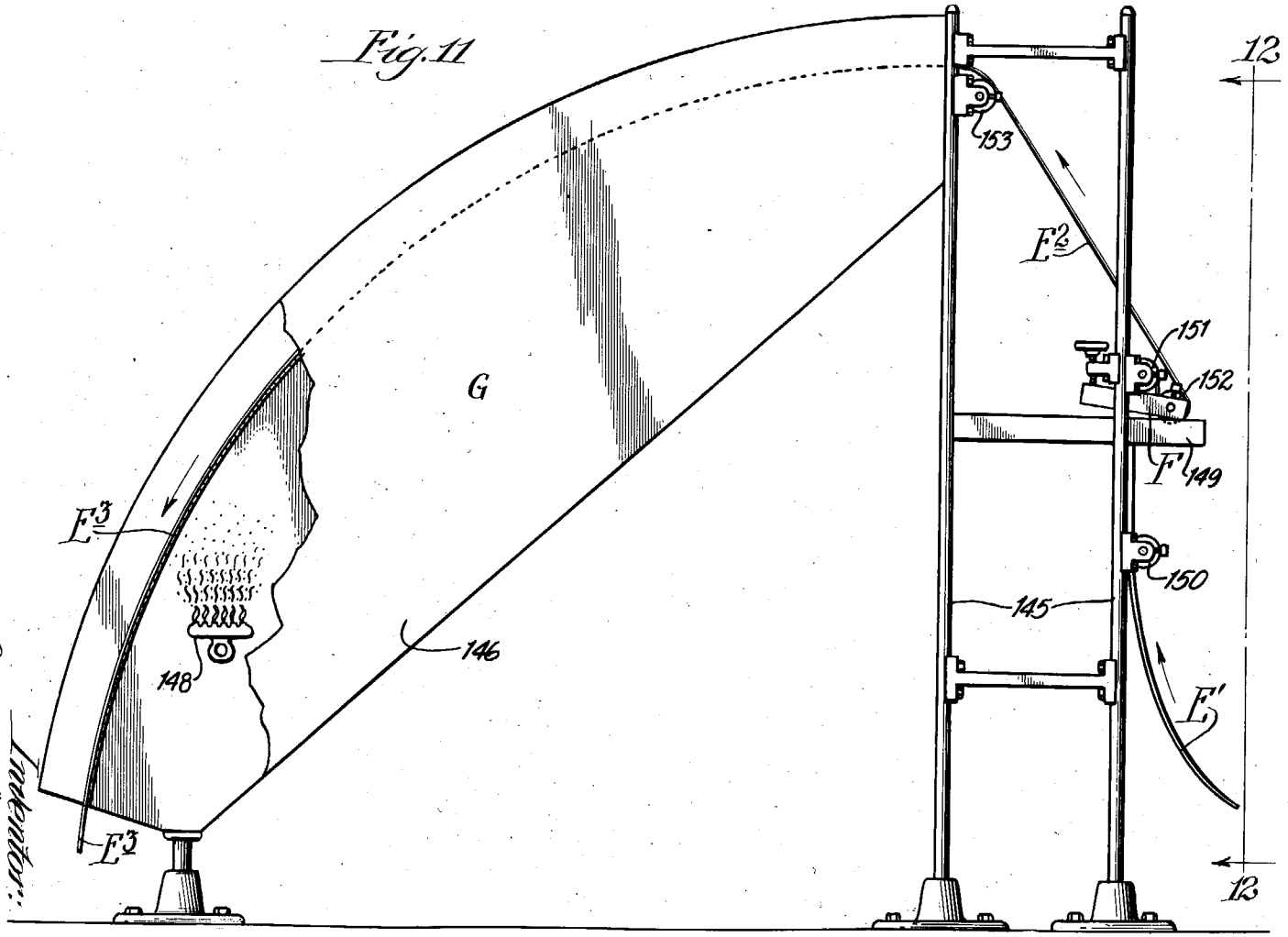
Figure 12:
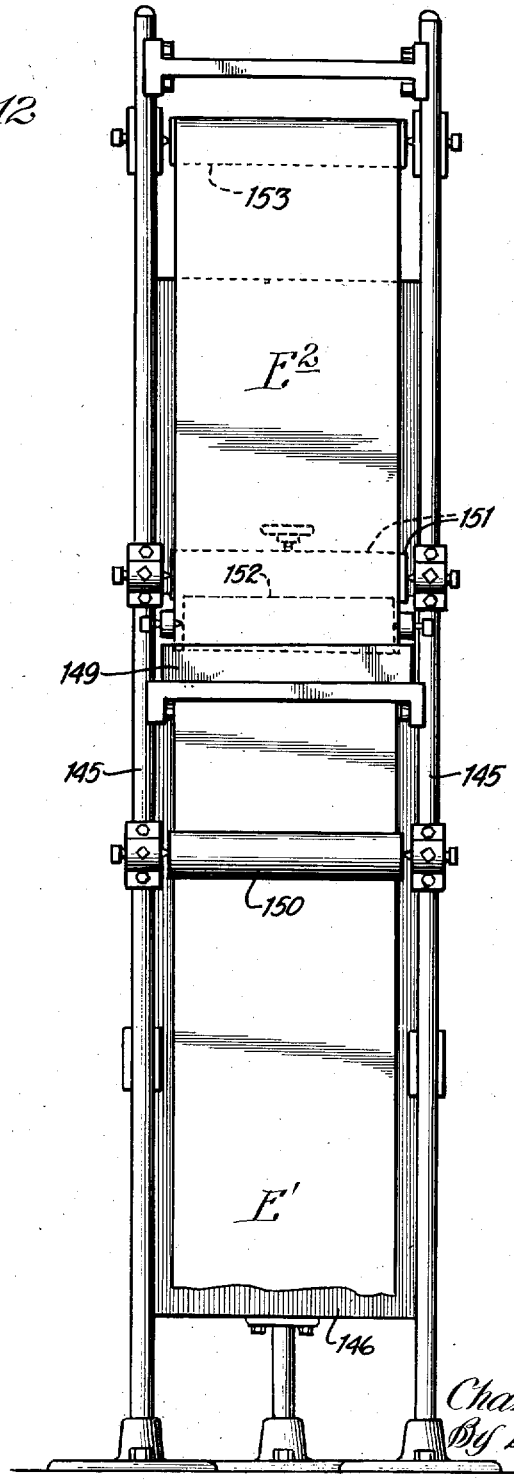
Figure 13:
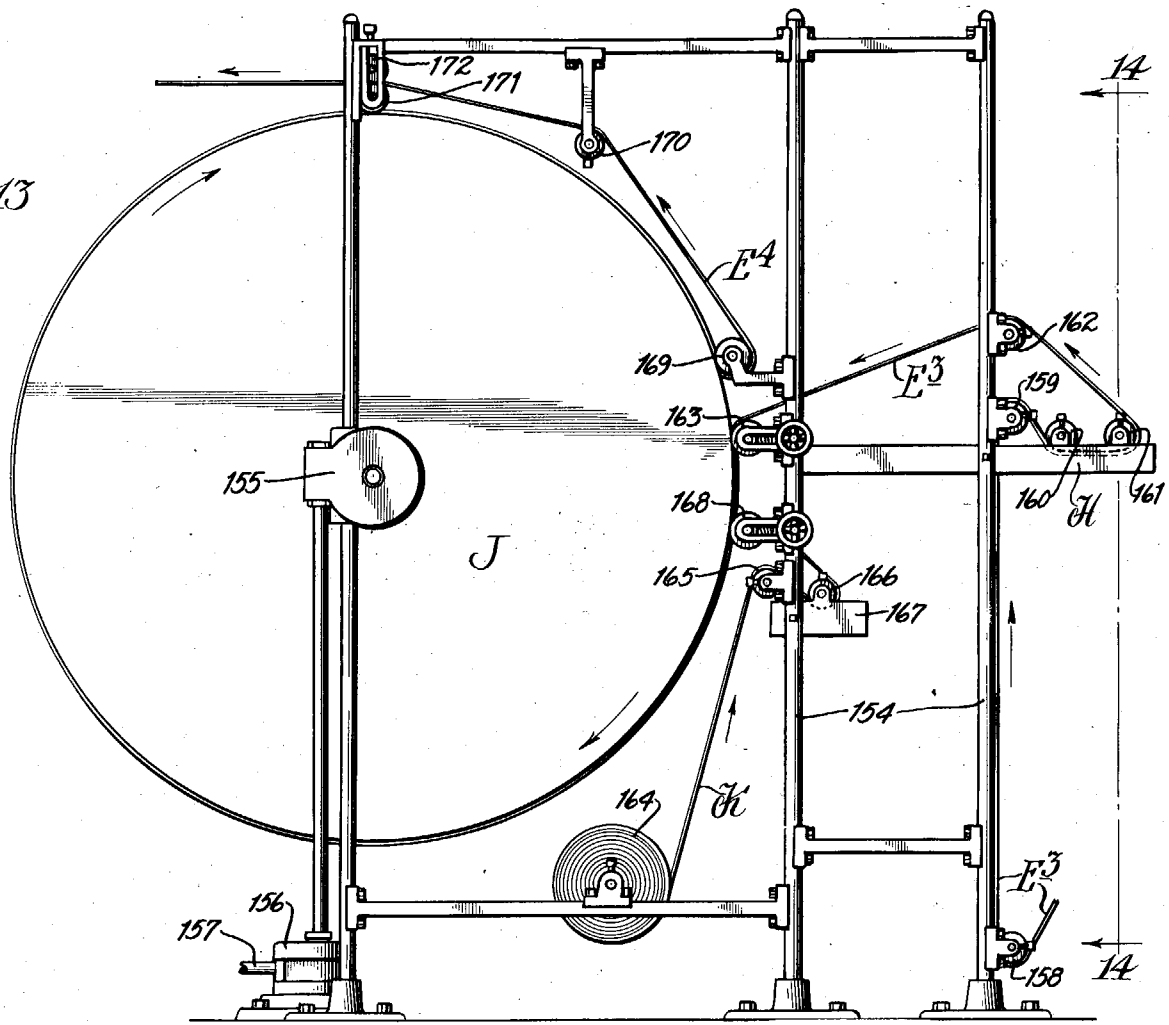
Figure 14:
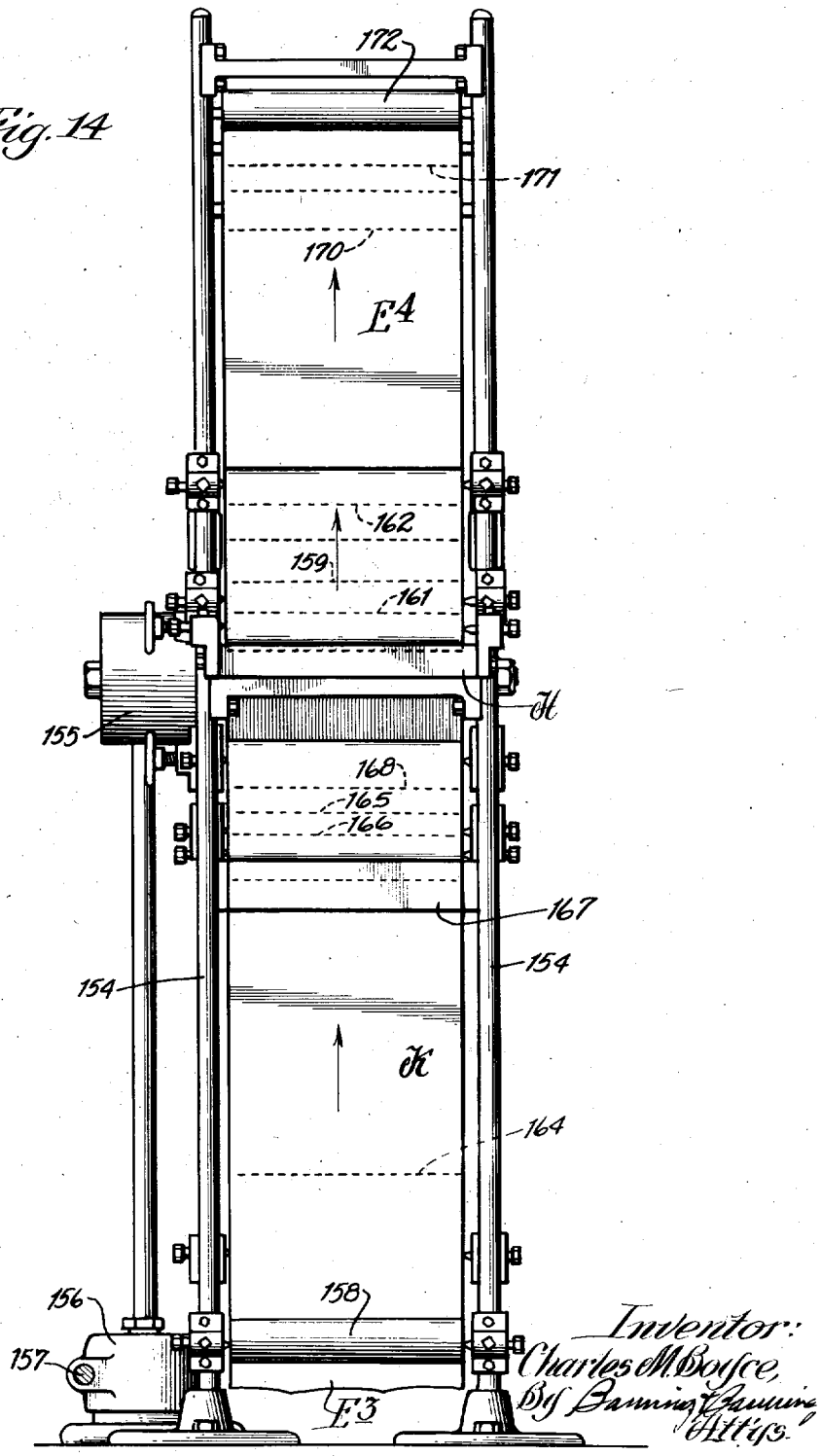

Fig. $2^a$ is an enlarged partial section on the line $2^a$—$2^a$ of Fig. 2;

Fig. 3 is a back elevation showing the mechanism in the position shown in Fig. 1;

Fig. 4 is a partial top plan view of the main frame with the carriage removed;

Fig. 5 is a front end elevation of the printing machine;

Fig. 6 is a rear end elevation of the same;

Fig. 7 is a partial enlarged view of the driving mechanism as seen from the front end;

Fig. 8 is a partial enlarged diagrammatic view of the ink and moisture distributing mechanism;

Figs. 9 and 10 are partial details of a paper feeding mechanism of the machine as viewed from the back;

Fig. 11 is a back elevation of a treating and drying mechanism for the paper as it emerges from the printing mechanism;

Fig. 12 is an end view of the same on the line 12—12 of Fig. 11;

Fig. 13 is the back elevation of an enameling drum which receives paper from the drying frame of Fig. 11; and Fig. 14 is an end view of the same as viewed on the line 14—14 of Fig. 13.

The printing mechanism consists essentially of a stationary frame A upon which is movably mounted a carriage B, which is propelled back and forth by means of a motor C, through a gear mechanism shown in Figs. 2 and 7. When the carriage is moved from the position shown in Fig. 1 at the front end of the machine to the rear end of the machine, it is raised by means of mechanism which will later be described. As it approaches the rear end of the machine, the carriage is lowered and stopped, after which it is propelled forward again to the position shown in Fig. 1. As it starts forward it passes over the printing plate D (Fig. 4) which has previously been inked, the carriage carrying a "rubber blanket" which picks up the image from the inked plate D, and, as the carriage moves toward the front end, deposits this image upon the upper face of the paper strip E.

Referring now to Fig. 10, this strip of paper E is fed to the left, while the carriage makes its return trip toward the right in Figs. 3, 4 and 10. On leaving the machine, as shown in Fig. 10, the paper strip E′ makes a loop as it passes into the treating mechanism F (Fig. 11) and from here the strip of paper $E^2$ passes through the drying frame G emerging at $E^3$, and passes up through the moistener H, and from here it passes on to the continuously driven enameling drum J, the paper strip leaving the drum J at $E^4$, and then passing on to a cutter, roll, or the like (not shown). If desired, a strip of cloth K may be applied to the back of the strip of paper while on the enameling drum.

With special reference to Figs. 1 to 10, the main frame A is supported upon end frames 15 and 16 and a center frame 17, and has horizontal rack bars 18 and 19 which extend throughout the length of the machine. Side rails 20 and 21 lie outside the rack bars and are guided thereon by means of shoulder screws 22 which operate in vertically disposed slots 23, as is shown in Fig. 2ª. The purpose of this is to permit a small amount of vertical movement of the side rails for the purpose of raising and lowering the carriage B, as will later be described. The side rail 21 is flat on top, while the rail 20 is provided with a central ridge 20ª, as shown in Fig. 2ª, to engage the grooved rollers of the carriage and of the blanket roll in order to prevent lateral movement of the same with respect to the plate and to the sheet of paper thereby providing positive registration.

*Propelling mechanism*

The motor C continuously drives a shaft 24 through a worm and worm wheel enclosed within the casing 25. The shaft 24 has a spur gear 26 keyed thereon which drives an idler 27, which in turn meshes with a gear 28 which is keyed on a shaft 29 which is journalled in suitable bearings in the carriage B. The shaft 29 has an idler gear 30 journalled thereon. The gear 30 is provided with a dental clutch 31 which is adapted to be engaged by a complementary dental clutch member 32, which is splined upon the shaft 29 and normally urged into engaging position by means of a spring 33 on the shaft 29. The clutch member 32 is operated by means of a pin 34 which is mounted to slide axially in the end of the shaft 29, and to engage the face of the cam 35, as will later be described in detail.

The idler gear 30 (Fig. 2) meshes with a big driving gear 36 on a shaft 37 which carries the rubber blanket 38, as shown in Fig. 5. A spur gear 39 similar to the gear 36 is carried on the other end of the shaft 37, these gears meshing with the longitudinal racks 18 and 19 respectively. The shaft 37 is suitably journalled in bearing blocks 40 and 41, one at each end of the shaft 37, as shown in Figs. 1 and 3. These bearing blocks are movable up and down in suitable guides in the carriage B, the height of the shaft 37, and hence the height of the blanket roll 38 with respect to the carriage B being controlled by means of mechanism under the control of a hand wheel 42. This mechanism is well known in the art of printing machines, and hence is not described in detail.

Thus it will be seen that so long as the cam 35 permits the clutch member 32 to engage the clutch 31, the motor driving through the shaft 24, the gears 26, 27, 28, 30 and 31 will propel the carriage B and all of the parts carried thereby in a forward direction, that is, toward the right as shown in Fig. 1.

The reverse motion of the carriage is accomplished through the gear 39 on the shaft 37, this gear meshing with an idler gear 43 running loose on the shaft 29, this gear in turn meshing with a gear 44 loose on a shaft 45, which is suitably journalled in the carriage B and which has keyed thereon a spur gear 46 which meshes with the idler 27. A clutch member 47, similar to the clutch member 32, is splined upon the shaft 45, and has a spring 48 which urges it into engagement with a dental clutch 49 on the face of the idler gear 44. The clutch member 47 is controlled by a pin 50 which is axially mounted in the hollow end of the shaft 45 so as to be operated by a cam 51 which is carried upon the side of the carriage B, and which later will be described.

Thus, with the parts in the position shown in Fig. 7 the clutch member 32 is disengaged from the idler gear 30, while the clutch member 49 is in engagement with the idler gear 44. This causes the carriage B to be propelled in a reverse direction, that is toward the left as shown in Fig. 1.

*Raising and lowering mechanism*

The movable side rail 20 is provided with brackets 52 and 53 upon which are mounted rollers 54 and 55 respectively. Wedges 56 and 57 are mounted to slide horizontally upon brackets 58 and 59 which are carried by the main frame A. These wedges are connected by means of rods 60 and 61, which are adjustably connected by a turn buckle 62 which is cylindrical in form. A block 63 is rotatably mounted on the turn buckle 62, and has a screw 64 by which it is adjustably secured thereon. A link 65 is connected at one end to the block 63 by means of a cap screw 66, and at the other to an operating lever 67 which is pivotally mounted at 68. The purpose of this lever will later be described.

A link 69 is connected to the cap screw 66, preferably by means of a threaded eye 70, the other end of the link 69 being connected with a lever 71 which is pivotally mounted on a shaft 72, which is suitably journalled in the main frame A. The upper end of the lever 71 carries a dog 73 which is pivotally mounted thereon by means of a pin 74. This dog is normally urged upwardly by means of a spring 75 upon a rod 76 which is pivotally mounted at 77 on the dog 73. The rod 76 is screw threaded and carries adjusting nuts 78 which limit the upward movement of the dog 73. A pawl 79 is pivotally mounted at 80 upon the carriage B and is normally pressed down by means of a suitable spring 81. These parts for raising and lowering the carriage are duplicated on the back of the machine, as will be seen by comparing Figs. 1 and 3.

Thus it will be seen that, as the carriage moves to the right, the pawl 79 will ride over the shoulder on top of the dog 73 thereby causing the two to engage, as shown in Figs. 1 and 2. As the carriage now starts back, the pawl 79 draws the dog 73 with it. As the pressure between the two increases the dog 73 is turned about the pin 74, compressing the spring 75 until eventually the two disengage by a gradual wiping movement. This accomplishes three things: first, it eliminates all the back lash in the gear train between the motor and the big gears 36, 39 and the racks 18 and 19; second, it draws the lever 71 to the right, as shown in Fig. 2, thereby moving the blocks 56 and 57 to the right through the agency of the links 65 and 69 thus lifting the rollers 54 and 55, and hence the side rail 20, which in turn lifts the carriage; and third, it draws the lever 67 to the right, as shown in Fig. 2 thereby setting it ready to be operated for lowering the carriage as it approaches the end of its next rearward movement.

*Reversing mechanism*

The cam levers 35 and 51 are mounted upon pivots $35^a$ and $51^a$ respectively on the front and back of the carriage, and have downwardly extending arms $35^b$ and $51^b$ adapted to contact reversing stops adjacent to the carriage. Referring now to Fig. 2, the stops 82 and 83 are adjustably mounted upon a rod 84 which is attached to the side rail 20. Similar stops are placed upon the back of the frame to engage the cam lever arm $51^b$. In order to hold the cam 51 in the engaged and disengaged positions and also to cause it to pass quickly from one position to the other, I have provided the cam lever 35 with a spring toggle consisting of a rod 85, which is slidable in a hinged mounting 86 and pressed outwardly by means of a spring 87. The toggle rod 85 also limits the swing of the cam lever 35 in both directions. As this toggle swings past dead center, it throws to the opposite side, insuring a full movement of the cam lever 35. This same arrangement is provided for the cam lever 51 on the back of the machine.

On the front side of the carriage B is a roller 88 which is mounted upon a bar 89 which is adjustably secured to the side of the carriage by means of an adjusting nut 90. The roller 88 is adapted to engage the lever 67, and to force the lever substantially to the position shown in Fig. 2. A similar roller 91 is located on the back of the machine, as shown in Fig. 3, and is similarly adjustably mounted on the side of the carriage, and engages a lever similar to the lever 67.

The operation of mechanism for stopping and reversing the travel of the carriage and of raising and lowering it is as follows: Assuming that the parts are in the position shown in Figs. 1 and 2 in which the carriage is still traveling to the right but approaching the end of its travel, the lever arm $35^b$ first strikes the stop 83 causing the cam 35 to rock backward, thereby forcing in the pin 34 and disengaging the clutch member 32 so that momentarily the driving mechanism of the carriage is completely disconnected from the driving motor C. At the same time the pawls 79, one at each side of the carriage, have somewhat overrun the dogs 73, the springs 81 and 75 yielding to let these elements pass each other. The stop $83^a$ on the back of the machine is set slightly forward of the stop 83 so as to insure the clutch member 32 being completely disengaged before the clutch member 47 is permitted to engage. As the carriage travels forward, therefore, the cam lever arm $51^b$ strikes the stop $83^a$, shifting the cam lever 51, and releasing the pin 50 and permitting the spring 48 to force the clutch element 47 into engagement with the gear 44. The motor, acting through the gears 46, the shaft 45 and the gears 44, 43 and 39 begin propelling the carriage in the reverse direction.

As the carriage moves back the pawls 79 acting on the dogs 73 draw the levers 71 to the left, and cause them to lift the carriage through the side rails 20 and 21, as has been previously described. At the same time the dogs 73 hold back on the carriage so as to take the back lash out of the gear train, so that the rearward motion of the carriage is very smooth and free from vibration and jerkiness, such as would otherwise occur. Also moving the lever 71 to the left moves the upper end of the reversing levers 67 to the right as viewed in Fig. 2, thereby setting it ready for the lowering operation as the carriage approaches the rear end of the machine on its next rearward movement.

As the carriage approaches the rear end of its movement, the cam lever arm 51 engages a stop on the back of the frame. This stop is not shown, but is set a little in advance of stop 82 of Fig. 3 so that the cam lever arm $51^b$ will strike it causing the cam 51 to force the pin 50 inward, thereby disengaging the clutch member 47. For an instant both this clutch member and the clutch member 32 are disengaged at the same time. As the carriage continues to move on back under its own momentum, the cam lever arm $35^b$ strikes the stop 82 thereby moving the cam 35 so as to release the pin 34, permitting the spring 33 to force the clutch member 32 into engagement with the clutch 31 of the gear 30.

About this same time the roller 88 strikes the lifting lever 67, while the roller 91 on the back of the carriage strikes a similar lever. As the carriage continues to move backward its inertia is utilized to force these levers back so as to move the wedges 56 and 57, thereby lowering the side rails 20 and 21.

This same movement of the lever 67 forces the upper end of lever 71 with its dog 73 to the right so that it is ready to receive the pawls 79 as the carriage again moves to the forward end as its next forward movement. The carriage now starts forward again and the operation, as previously described, is repeated.

In order to insure that the back lash is removed from the gear train on the forward movement of the carriage, there is provided a stabilizer 92 which is pivotally mounted at 93 on the side of the carriage B (Fig. 3), this braking member having a spring 94 which forces it downwardly, while a bolt and nut 95 limit the extent of its swing in a downward direction. The stabilizer 92 is adapted to pass up over a pin 96 on the extreme rear end of the main frame as shown in Fig. 2. The pressure thus exerted is sufficient to hold the carriage back until substantially all the back lash is removed from the train of gears, after which the spring 94 yields sufficiently to permit the carriage to start forward.

Thus it will be seen that on its rearward movement the carriage is lifted sufficiently to cause the blanket roll 38 to clear the paper E and plate D, the carriage then being lowered when at the extreme rear end of its movement so that the blanket roll 38 can then make contact with the face of plate D on its next forward movement transferring the image thus received to the paper E at a later stage in this same forward movement.

*Moistening and inking mechanism*

Referring now to Figs 1 and 8, the moistening mechanism consists of a moistening roller 95 with a series of moisture distributing rollers 96. Moisture is obtained from a tank 97 which has a roller 98 dipping into a suitable moistening liquid which is used to moisten the plate. The roller 98 is mounted upon a shaft 99 which is driven by means of a chain 100 from the shaft 24. A ductor roller 101 serves to carry moisture from the roller 98 to the moistening roller 95.

The mechanism for intermittently actuating the ductor roller is as follows: The shaft shaft 24 acting through the chain 102 drives a shaft 103 which carries a friction plate 104. This friction plate has a friction roller 105 splined upon a shaft 106, the roller 105 being moved in and out on the friction plate 104 by means of a screw 107. The shaft 106 carries cam 108 which is adapted at each revolution to engage the outer end of the cam follower 109, and to force it outwardly thereby moving the ductor out of contact with the roller 98 and into contact with the moistening roller 95.

It will thus be seen that by moving the friction roller 105 toward the center of the plate 104 the speed of the shaft 106 will be reduced, thereby reducing the frequency with which the ductor roller 101 is actuated, and hence the amount of the moistening liquid fed to the moistening roller 95.

Ink is supplied to the plate from an ink reservoir 110 which is carried on suitable supports from the carriage B, and has a roller 111 which dips into the ink in the reservoir 110. A ductor roller 112 is carried upon a lever 113 which is pivotally mounted at 114 and normally lies in contact with a large ink roller 115.

The upper end of the lever 113 is actuated by a cam 116 on a shaft 117 which is driven by means of a friction roller 118, which is in contact with the friction plate 104. The friction roller 118 is movable in and out along the face of plate 104 by means of an adjusting screw 119. Thus the frequency with which the ductor 112 makes contact with the roller 111 in ink fountain is regulated, and this in turn regulates the amount of ink fed to the ink distributing rollers, of which the large ink roll 115 is the first.

The ink on the large ink roller 115 is then fed through a series of distributing rollers 120 to the plate inking rollers 121 and 122, which have gears on the front side of the machine meshing with the rack 18. The intermediate roller 123 has a gear (not shown) meshing with the rack 19 on the back of the machine. The various rollers 115, 120, 121, 122 and 123 are suitably journalled in bearings in an auxiliary frame carried by the main frame B, and the whole train of ink distributing rollers is driven by the geared rollers 121, 122 and 123, the diameters of these rollers being coincident with the pitch diameters of the gears to which they are attached. This is true also of the roller 95, which has a gear driven by the rack 18.

Moistening and inking of the printing plate D is accomplished on the forward motion of the carriage B just after the "rubber blanket" roller 38 has passed over the plate D removing the ink image therefrom. It is necessary, however, to protect the paper roll E from the moistening and inking rollers 95 to 121 etc. To do this, a relatively thin metal plate 124 is provided at the side of each of the racks 18 and 19, this plate serving as a track upon which the rollers 95, 121 and 123 roll in order to lift them above the surface of the paper E. When, however, the carriage has advanced a little further to the right it is lifted bodily, as has previously been described, so as to carry these rollers entirely clear of both the paper E and the plate D, and they remain so elevated while the carriage is traveling back and until it is again lowered. These gears are still in contact however with the plate 124.

*Paper feeding mechanism*

The paper upon which the prints are to be made is in the form of a roll 125 which is carried upon a shaft 126, which is rotatable in a notched support 127 attached to the frame member 17. This shaft carries a friction wheel 128 over which passes a friction band 129 which is secured at each end to the support 127, the opposite end passing over the wheel 128 and carrying a weight (not shown). The paper strip E passes around rollers 130 and 131 and forward over a table 132, thence under the tension roller 133, and over the feed roller 134, from which it emerges as the paper strip E′ which then passes into the treating and enameling apparatus Fig. 11.

The feeding of the paper strip E is accomplished by the feed roller 134 which has a gear 135 which meshes with a gear (not shown), associated with the sprocket 136. A ratchet also (not shown) between the gear 135 and the roller 134 drives the latter only when the sprocket 136 is turned in a clockwise direction. A chain 137 passes over the sprocket 136 and carries a weight 138, the opposite end of the chain being secured to a rod 139 which is slidable in a tube 140. The tube is cut away along one side at 141, and a knob 142 projects out through this cut away portion. A finger 143 is carried by the carriage B, and is adapted to engage the knob 142, which is adjustably mounted upon the rod 139.

Thus as the carriage moves toward the right, as shown in Figs. 3 and 9, the finger 143 engages the knob 142 and moves it to the right, thereby turning the sprocket 136 to the right, while the feed roller 134 is turned to the left by means of the gear 135, thus propelling the paper strip E to the left. As the carriage returns to the left the finger 143 moves to the left, permitting the rod 139 to move also to the left as the knob 142 is held in engagement with the finger 143 by the weight 138. Due to the ratchet action between the sprocket 135 and the feed roll 134 the latter remains stationary during this backward movement of the carriage B and of the rod 139.

Thus it will be seen that a mechanism is provided whereby an ink image can be transferred from a plate to a sheet of paper with a minimum of injury to the plate, so that the latter may be of the swelled gelatin type, and a great many prints may be taken therefrom without material injury thereto. This is due to certain inherent qualities in the machine, one of the principal features being the rubber blanket which has a rolling action over said plate.

The paper strip E is thus fed through the printing machine intermittently emerging therefrom as shown in Fig. 9, to form a long loop E′, the other end of the loop leading into the treating and drying mechanism, shown in Fig. 11. From hereon, as will presently be seen, the paper strip is drawn continuously.

*Coating and enameling mechanism*

Figs. 11 and 12 show the coating and drying mechanism, while Figs. 13 and 14 show the enameling drum. The coating and drying comprises a frame 145 to which is attached a drying frame or housing 146 of sheet metal, or the like, having a surface 147 over which the paper strip $E^3$ passes. The surface 147 is shown as curved so as the better to prevent the edges of the paper curling up as it dries. A gas burner or other heating element 148 is placed within the sheet metal housing 146.

The frame 145 carries a suitable tank 149 which contains a liquid coating which is to be applied to the printed face of the paper strip E′. This liquid material is preferably a thin transparent solution of gelatin, or the like, which when applied to the paper will give a thin transparent coating or film. This coating material is or may be substantially the same as that commonly used for treating the surface of paper for making photographic paper without, however, the inclusion of a silver or other light sensitive chemical.

While it will be understood that the prints which have been made by the machine previously described are preferably of the continuous tone type, it will be understood that they are not necessarily limited thereto, as half-tone prints may also be made and coated thereby. The machine in the process previously described is intended primarily for use with collotype or swelled gelatin plates, but halftone plates can be used, also plates made by photogravure, transfer processes or photographing down processes and the like, and prints made by any of these processes may be surfaced and enameled by the mechanism which is now being described.

The paper strip E′ which has previously been printed by any of the foregoing processes or in water colors may be passed up under the roller 150, over the roller 151, and down under the roller 152, which submerges the entire width of the paper strip in the gelatin bath 149. For this purpose the roller 152 is considerably narrower than the width of the paper strip E′; the gelatin bath due to capillary attraction will permit this strip to be submerged some distance beneath its surface without overflowing upon the back thereof.

As the paper strip $E^2$ with its surface film of gelatin emerges from the bath 149, it passes up over the roller 153 and slides around the back 147 of the drier G emerging at the bottom at a dried strip $E^3$ which passes over a series of rollers and eventually reaches the enameling drum J, shown in Figs. 13 and 14. This is mounted upon a frame 154, and is driven very slowly, preferably by means of worms and worm wheels within the housings 155 and 156. The worm shaft 157 connects with a motor or other suitable source of power (not shown). To reach the drum J, the sheet of coated and dried paper $E^3$ passes under the roller 158, thence up over the roller 159, and down under the rollers 160 and 161. As the strip passes under the latter rollers it is brought into contact with a surface of alcohol and water or other suitable moistening medium which would put the coated surface of the paper in condition for enameling.

As the paper strip emerges from the back of the moistening medium H it passes up over the roller 162, and over the roller 163, which latter forces the treated surface of the paper firmly into contact with the cylindrical surface of the enameling drum J. A suitable distance is provided between the roller 161 and the roller 163 to permit the liquid in the bath H to partially soften the coating on the paper so that when it is brought into contact with the highly polished surface of the drum J it will make intimate contact therewith the roller 163 acting as a squeegee roller to force the moistened surface of paper firmly into contact with the polished surface of the drum.

For some purposes it is desired to provide the strip of paper with a backing of cloth, or the like. Such a backing of gummed cloth K may be provided by taking it from the roll of cloth 164 and passing it up over the roller 165, down under the roller 166 which dips the cloth into a bath of liquid 167, thence up over the roller 168 which forces it firmly against the back of the paper strip. The rollers 163 and 168 are provided with adjustable means whereby the pressure applied thereon may be varied to suit conditions.

The enameling drum J slowly revolving in a clockwise direction, as shown in Fig. 13, and the moistener in the bath H, preferably alcohol and water, has had time to evaporate by the time the paper strip passes around with the drum to the stripping roller 169. This roller serves to pull the paper strip off the face of the drum, after which the enameled and dried paper strip $E^4$ passes up over the roller 170, and out between the rollers 171 and 172. From here the paper strip passes on to a trimmer, or the like, where the prints are trimmed and separated.

By this means any desired surface may be obtained, such as matte, semi-matte, or gloss, the degree of gloss depending very largely upon the amount of coating material applied to the strip and also upon the paper surface.

Thus it will be seen that a very simple and efficient means is provided for enameling the surface of prints of various kinds so as to give them the gloss, depth, and brilliancy of contact photographic prints.

While I have shown but a single embodiment of my invention, it is to be understood that it is capable of many modifications. Changes, therefore, in the construction and arrangement may be made which do not depart from the spirit and scope of my invention as disclosed by the appended claims.

I claim:

1. In a printing machine, a frame adapted to hold a printing plate, means for holding a sheet of paper, a carriage movable on said frame and having means for transferring the image from the plate to said sheet, means for inking the printing plate, means for propelling said carriage back and forth on said frame, means for raising and lowering the carriage with respect to said frame during part of the travel of said carriage, and means operable on the reversing of said carriage for stabilizing the return movement thereof.

2. In a printing machine, a frame adapted to hold a printing plate, means for holding a sheet of paper, a carriage movable on said frame and having means for transferring the image from the plate to said sheet, means on said carriage for inking the printing plate, means for propelling said carriage back and forth on said frame, means for raising and lowering the carriage with respect to said frame during part of the travel of said carriage, and means operable on the reversing of said carriage for stabilizing the return movement thereof.

3. In a printing machine, a frame adapted to hold a printing plate, means for holding a sheet of paper, means for feeding said sheet of paper from a roll across said paper holding means, a carriage movable on said frame and having means for transferring the image from the plate to said sheet, means for inking the printing plate, means for propelling said carriage back and forth on said frame, means for raising and lowering the carriage with respect to said frame during part of the travel of said carriage, and means operable on the reversing of said carriage for stabilizing the return movement thereof.

4. In a printing machine, a frame adapted to hold a printing plate, means for holding a sheet of paper, a carriage movable on said frame and having means for transferring the image from the plate to said sheet, means for inking the printing plate, means for propelling said carriage back and forth on said frame, means for reversing said propelling means, and means operable by said propelling means for raising the carriage with respect to said frame during part of the travel of the said carriage.

5. In a printing machine, a frame adapted to hold a printing plate, means for holding a sheet of paper, a carriage movable on said frame and having means for transferring the image from the plate to said sheet, means for inking the printing plate, means for propelling said carriage back and forth on said frame, interengaging means carried by said carriage and frame for raising and lowering the carriage with respect to said frame during part of the travel of said carriage, and means operable on the reversing of said carriage for stabilizing the return movement thereof.

6. In a printing machine, a frame adapted to hold a printing plate, means for holding a sheet of paper, a carriage movable on said frame and having means for transferring the image from the plate to said sheet, means for inking the printing plate, means for propelling said carriage back and forth on said frame, means for separating said carriage and frame during part of the travel of said carriage, and means operable on the reversing of said carriage for stabilizing the return movement thereof.

7. In a printing machine, a frame adapted to hold a printing plate, means for holding a sheet of paper, a carriage movable on said frame and having means for transferring the image from the plate to said sheet, means for inking the printing plate, means for propelling said carriage back and forth on said frame, and interengaging means carried by said carriage and frame and operable on the reversing of said carriage for separating the carriage and frame during part of the travel of said carriage.

8. In a printing machine, a frame adapted to hold a printing plate, means on said frame for holding a sheet of paper, rails on said frame, means for raising and lowering said rails with respect to the frame, a carriage movable back and forth on said rails, means on said carriage for transferring an ink image from said plate to said sheet of paper, and means operable on the reversing of said carriage for stabilizing the return movement thereof.

9. In a printing device of the class described including means for supporting a web of paper, means for feeding said web across said supporting means, and means for imprinting a substantially continuous tone image directly onto said web, the combination of finishing means coordinated with said printing means and adapted to successively engage the imprinted surface of said web for altering the image thereon to produce the brilliancy, depth of tone and definition of photographic prints.

10. The combination with a printing press comprising supporting means for a web, feeding means for said web, and means for printing a substantially continuous tone image on said web, of means for treating said image to alter its brilliancy, depth of tone and definition in a manner corresponding to that of a true photographic print.

11. In a device of the class described, comprising means for supporting a web, means for feeding said web, and means for transferring a substantially continuous tone image to said web, the combination of means coordinated with said transferring means for altering said image as it emerges from said last mentioned means.

12. In a printing device including means for supporting a suitable sheet material, means for feeding said material and means for imprinting an ink image onto the material, the combination of finishing means coordinated with said printing means and adapted to successively engage the imprinted surface of the material for altering the image thereon to produce prints having accentuated depth and brilliance.

13. The combination with a printing press comprising supporting means for a suitable sheet material, feeding means for said material and means for printing an image on said material, of means for treating said image to accentuate its brilliance, depth of tone and definition.

14. In a device of the class described, comprising means for supporting a suitable sheet material, means for transferring an image to said material and means for feeding said material, the combination of means coordinated with said transferring and feed means for altering said image as it emerges from said last mentioned means to accentuate its depth and brilliance.

CHARLES M. BOYCE.